United States Patent
Li et al.

(10) Patent No.: US 10,702,769 B2
(45) Date of Patent: Jul. 7, 2020

(54) MOBILE TERMINAL AND METHOD FOR CONTROLLING MOBILE TERMINAL BY USING TOUCH INPUT DEVICE

(71) Applicant: Samsung Electronics Co., Ltd, Suwon-si (KR)

(72) Inventors: Manman Li, Tianjin (CN); Rui Mao, Tianjin (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/752,554

(22) PCT Filed: Aug. 12, 2016

(86) PCT No.: PCT/KR2016/008877
§ 371 (c)(1),
(2) Date: Nov. 16, 2018

(87) PCT Pub. No.: WO2017/026835
PCT Pub. Date: Feb. 16, 2017

(65) Prior Publication Data
US 2019/0083881 A1 Mar. 21, 2019

(30) Foreign Application Priority Data
Aug. 13, 2015 (CN) .......................... 2015 1 0497976

(51) Int. Cl.
*G06F 15/16* (2006.01)
*A63F 13/2145* (2014.01)
(Continued)

(52) U.S. Cl.
CPC ........ *A63F 13/2145* (2014.09); *A63F 13/426* (2014.09); *A63F 13/493* (2014.09);
(Continued)

(58) Field of Classification Search
CPC ................ A63F 13/2145; A63F 13/493; A63F 2300/1075; A63F 2300/636; G06F 16/00;
(Continued)

(56) References Cited

U.S. PATENT DOCUMENTS 8,928,587 B1 * 1/2015 Smus ...................... H04W 4/38
345/156
9,086,746 B1 7/2015 Olsen et al.
(Continued)

FOREIGN PATENT DOCUMENTS

KR 10-2015-0054588 A 5/2015
KR 20150060364 A 6/2015

OTHER PUBLICATIONS

International Search Report dated Nov. 18, 2016 in connection with International Patent Application No. PCT/KR2016/008877.

*Primary Examiner* — Justin L Myhr

(57) ABSTRACT

A mobile terminal for providing data to another mobile terminal through a touch input device includes: a touch screen configured to receive a touch input by the touch input device; a communication module configured to transmit and receive data through a communication connection with the touch input device; and a processor configured to, when a first touch input by the touch input device is received by the touch screen, provide, to the touch input device, predetermined data associated with a first application that is currently being executed in the mobile terminal, such that the predetermined data is provided to the other mobile terminal through the touch input device.

20 Claims, 22 Drawing Sheets

(51) Int. Cl.
*G06F 3/0482* (2013.01)
*A63F 13/426* (2014.01)
*G06F 3/0354* (2013.01)
*G06F 3/0488* (2013.01)
*A63F 13/493* (2014.01)

(52) U.S. Cl.
CPC ........ *G06F 3/03545* (2013.01); *G06F 3/0482* (2013.01); *G06F 3/0488* (2013.01); *G06F 3/04883* (2013.01); *A63F 2300/1075* (2013.01); *A63F 2300/636* (2013.01)

(58) Field of Classification Search
CPC .... G06F 3/0354; G06F 3/0482; G06F 3/0488; G06F 9/445
See application file for complete search history.

(56) References Cited

U.S. PATENT DOCUMENTS

| | | | |
|---|---|---|---|
| 2005/0025078 A1* | 2/2005 | Hwang | G06F 3/03545 370/310 |
| 2007/0021216 A1* | 1/2007 | Guruparan | A63F 13/10 463/43 |
| 2008/0256471 A1* | 10/2008 | Okamoto | G06F 3/0486 715/769 |
| 2009/0054108 A1* | 2/2009 | Kito | G06F 3/04883 455/566 |
| 2013/0046893 A1* | 2/2013 | Hauser | G06F 9/4856 709/226 |
| 2013/0091238 A1 | 4/2013 | Liu et al. | |
| 2013/0106803 A1 | 5/2013 | Tan | |
| 2013/0136370 A1* | 5/2013 | Tai | G06T 11/60 382/224 |
| 2013/0181953 A1 | 7/2013 | Hinckley et al. | |
| 2014/0059159 A1 | 2/2014 | Lowery et al. | |
| 2014/0059169 A1 | 2/2014 | Ko et al. | |
| 2015/0091917 A1* | 4/2015 | Li | G06F 3/1446 345/520 |
| 2015/0135092 A1 | 5/2015 | Lee et al. | |
| 2016/0364600 A1* | 12/2016 | Shah | G06K 9/00087 |

* cited by examiner

MOBILE TERMINAL AND METHOD FOR CONTROLLING MOBILE TERMINAL BY USING TOUCH INPUT DEVICE

CROSS-REFERENCE TO RELATED APPLICATIONS

The application is a 371 of International Patent Application No. PCT/KR2016/008877 filed Aug. 12, 2016, which claims priority to Chinese Patent Application No. 201510497976.9 filed Aug. 13, 2015, the disclosures of which are herein incorporated by reference in their entirety.

TECHNICAL FIELD

The present invention relates to a mobile terminal and a method of controlling the mobile terminal by using a touch input device, and more particularly, to a mobile terminal for providing data to another mobile terminal through a touch input device and a method of controlling the mobile terminal.

BACKGROUND

Recently, as electronic technology continues to develop, the application of touch control technology has gained popularity, and technology for controlling terminals through touch input and the touch input devices have attracted attention. Currently, a stylus pen is one from among representative touch input devices.

The stylus pen may generate a touch input by touching the tip thereof to a touch screen, and may perform a control operation on a screen through a touch on the touch screen. In particular, the stylus pen is more suitable for operations such as writing, screen capture, and the like. For example, screen capture may be performed by designating a region that needs to be captured on the touch screen of the mobile terminal by using the stylus pen, and the captured screen is stored in the mobile terminal. Further, ideas of a user may be recorded at any time by performing writing in a memo application by using the stylus pen.

The control technology of the mobile terminal according to the related art is limited to controlling one terminal through the touch input by using the touch input device. However, when a plurality of terminals are present, there is a need for a control technology capable of continuously executing an application between different terminals through a touch input.

SUMMARY

The present disclosure provides a mobile terminal for providing data to another mobile terminal through a touch input device and continuously executing an application, and a method of controlling the mobile terminal.

According to an embodiment, it is possible to transmit data between different terminals through a touch input device and to continuously execute an application.

DETAILED DESCRIPTION OF THE DRAWINGS

DETAILED DESCRIPTION

Figure 1A:
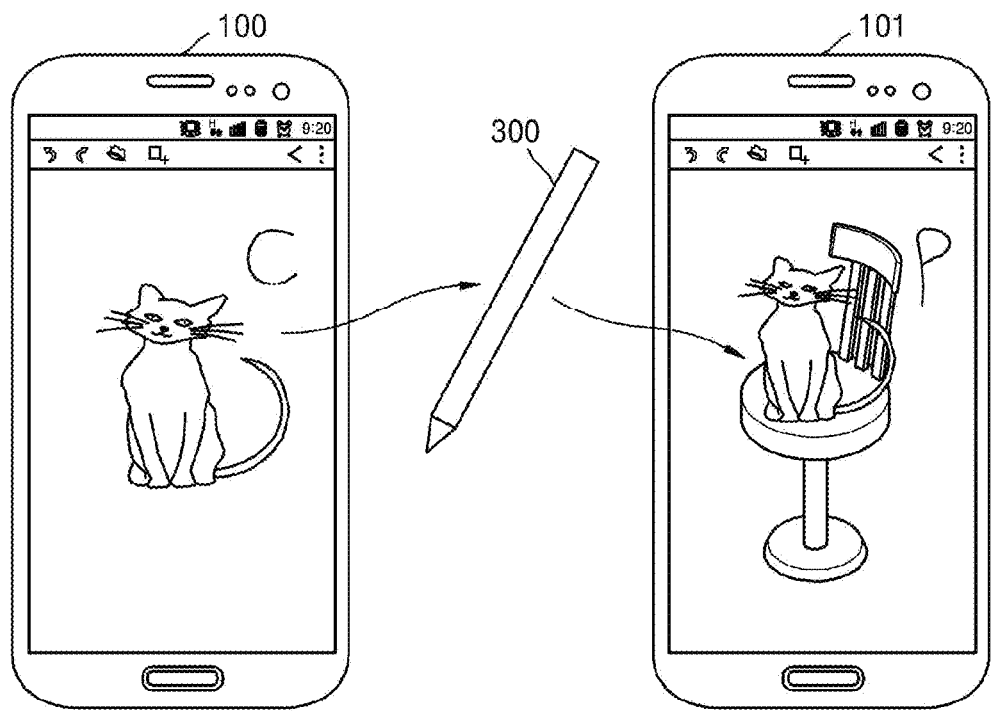
FIG. 1A is a diagram schematically illustrating data being provided to another terminal through a stylus pen, according to an embodiment.

In one embodiment, a mobile terminal for providing data to another mobile terminal through a touch input device includes: a touch screen configured to receive a touch input by the touch input device; a communication module configured to transmit and receive data through a communication connection with the touch input device; and a processor configured to, when a first touch input by the touch input device is received by the touch screen, provide, to the touch input device, predetermined data associated with a first application that is currently being executed in the mobile terminal, such that the predetermined data is provided to the other mobile terminal through the touch input device.

In one embodiment, when the first touch input is received by the touch screen, the processor is further configured to determine a type of the first touch input and provide predetermined data corresponding to the first application and the determined type to the touch input device.

In one embodiment, when the first touch input is received by the touch screen, the processor is further configured to control display of a list of the predetermined data associated with the first application on the touch screen and provide data selected from the displayed list by the user to the touch input device.

In one embodiment, wherein the predetermined data associated with the first application includes at least one of an image or a text selected on an execution screen of the first application by the user, a file that is being edited in the first application, and a multimedia file that is being reproduced in the first application.

In one embodiment, as a second touch input is input to the other mobile terminal by the touch input device, the predetermined data provided to the touch input device is transmitted from the touch input device to the other mobile terminal, and the transmitted predetermined data is provided to a second application executed by the other mobile terminal.

In one embodiment, the predetermined data includes link information for downloading installation data for installing the second application that is the same as the first application.

In one embodiment, the predetermined data includes setting data for setting the second application that is the same as the first application.

In one embodiment, the predetermined data includes data indicating a state of the first application when the first touch input is received by the touch screen, and a state of the second application is made substantially identical to the state of the first application by using the predetermined data provided to the second application.

In one embodiment, the first application is a web browsing application, and the predetermined data includes an address of a current webpage of the first application, and the predetermined data is provided to the second application that is the web browsing application, and a web page corresponding to the address of the webpage is opened in the second application.

In one embodiment, in a case where the first application has a multimedia reproduction function and multimedia is paused in the first application when the first touch input is received by the touch screen, the predetermined data includes data indicating a reproduction state of the multimedia and a paused reproduction position of the multimedia, and the predetermined data is provided to the second application having the multimedia reproduction function, and the reproduction of the multimedia is started in a paused state at the reproduction position in the second application.

In one embodiment, in a case where the first application is a game application and a game is paused in the first application when the first touch input is received by the touch screen, the predetermined data includes data indicating a progress state of the game and a paused position of the game, and the predetermined data is provided to the second application that is the same as the first application, and the game is started in the paused state at the position in the second application.

In one embodiment, in a case where the first application has an account login function and an account is logged into in the first application when the first touch input is received by the touch screen, the predetermined data includes data indicating information about the logged-in account, and the predetermined data is provided to the second application that is the same as the first application, and the account is logged into in the second application.

In one embodiment, when a third touch input by the touch input device is received by the touch screen, the processor is further configured to receive the predetermined data provided to the touch input device from the touch input device, and provide the predetermined data received from the touch input device to a third application in the mobile terminal.

In one embodiment, a method of controlling a mobile terminal by using a touch input device includes: receiving a first touch input by the touch input device on a touch screen of a first mobile terminal; transmitting predetermined data associated with a first application that is currently being executed in the first mobile terminal from the first mobile terminal to the touch input device; receiving a second touch input by the touch input device on a touch screen of a second mobile terminal; and transmitting predetermined data stored in the touch input device from the touch input device to the second mobile terminal.

In one embodiment, the predetermined data transmitted from the touch input device to the second mobile terminal is provided to a second application executed by the second mobile terminal.

In one embodiment, the predetermined data includes link information for downloading installation data for installing the second application that is the same as the first application.

In one embodiment, the predetermined data includes setting data for setting the second application that is the same as the first application.

In one embodiment, the predetermined data includes data indicating a state of the first application when the first touch input is received by the touch screen, and a state of the second application is made substantially identical to the state of the first application by using the predetermined data provided to the second application.

In one embodiment, when a third touch input by the touch input device is received by the touch screen of the first mobile terminal, the predetermined data transmitted from the first mobile terminal to the touch input device is transmitted to the first mobile terminal and provided to a third application in the first mobile terminal.

MODE OF THE INVENTION

The advantages and features of the present invention and methods for achieving them will become more apparent from the following embodiments that are described in detail in conjunction with the accompanying drawings. However, it should be understood that the present invention is not limited to the following embodiments, and various modifications can be made without departing from the scope of the present invention. The embodiments set forth herein are provided so that this disclosure will be thorough and complete, and will fully convey the concept of the invention to those skilled in the art. The present invention should be defined by the appended claims. Like reference numerals are assigned to like elements throughout.

It will be understood that when a region is referred to as being "connected to" or "coupled to" another region, it may be directly connected or coupled to the other region or intervening regions may be present. It will be understood that terms such as "comprise", "include", and "have", when used herein, specify the presence of stated elements, but do not preclude the presence or addition of one or more other elements. In addition, the term "unit" as used herein refers to software or hardware component such as FPGA or ASIC, and "unit" performs certain functions. However, "unit" is not limited to software or hardware. A "unit" may be configured in an addressable storage medium or configured to reproduce one or more processors. Thus, for example, a "unit" includes components such as software components, object-oriented software components, class components, and task components, processes, functions, attributes, procedures, subroutines, segments of programs codes, drivers, firmware, microcodes, circuits, data, databases, data structures, tables, arrays, and variables. Functions provided in the components and the "units" may be combined with a smaller number of components and "units" or may be separated from additional components and "units."

Hereinafter, embodiments of the present invention will be described in detail with reference to the accompanying drawing so that those of ordinary skill in the art can easily carry out the embodiments of the present invention. However, an embodiment may be implemented in various different forms and is not limited thereto. In order to clearly describe the embodiment in the drawings, portions not related to the description are omitted.

The terms used herein are those general terms currently widely used in the art in consideration of functions in regard to the inventive concept, but the terms may vary according to the intention of those of ordinary skill in the art, precedents, or new technology in the art. In addition, specified terms may be selected by the applicant, and in this case, the detailed meaning thereof will be described in the detailed description of the inventive concept. Thus, the terms used herein should be understood not as simple names but based on the meaning of the terms and the overall description of the inventive concept.

FIG. 1A is a diagram schematically illustrating that data is provided to another terminal through a stylus pen, according to an embodiment.

Referring to FIG. 1A, when an image edit application is being executed in a mobile terminal 100 and a touch gesture having a shape "C" is input on a touch screen of the mobile terminal 100 by a stylus pen 300 in a state in which a cat image is selected by an operation of the stylus pen 300, the mobile terminal 100 transmits data including the selected cat image to the stylus pen 300 through a wireless communication connection. The data including the cat image is stored in a memory of the stylus pen 300. When an image edit application is being executed in another mobile terminal 101 and a touch gesture having a shape "P" is input on a touch screen of the mobile terminal 101 by the stylus pen 300, the other mobile terminal 101 receives data including the cat image from the stylus pen 300. The received data is provided to the image edit application that is being executed in the other mobile terminal 101, and the cat image is pasted on an existing image.

Figure 1B:
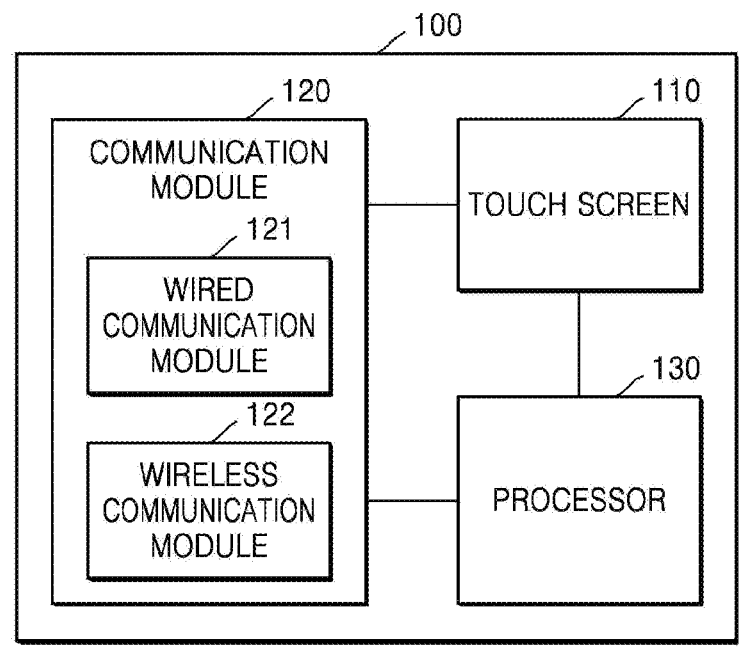
FIG. 1B is a block diagram illustrating a configuration of a mobile terminal according to an embodiment.

FIG. 1B is a block diagram illustrating the configuration of the mobile terminal according to an embodiment.

Referring to FIG. 1B, the mobile terminal 100 may include a touch screen 110, a communication module 120, and a processor 130. As described below with reference to FIG. 4, the mobile terminal 100 may further include a pen insertion hole 410, a data transmission interface 420, and/or a power supply interface 430.

The communication module 120 is configured to form a communication connection with a touch input device and transmit and receive data through the communication connection. The communication module 120 may include a wired communication module 121 and/or a wireless communication module 122.

As described below with reference to FIG. 4, the wired communication module 121 may form a wired communication connection with the stylus pen 300 in a state in which the stylus pen 300 is inserted into the pen insertion hole 410 such that a metal contact point 321 exposed on a pen body 310 of the stylus pen 300 is connected to the data transmission interface 420 in the pen insertion hole. The wired communication module 121 may form the wired communication connection with the touch input device in a state in which the touch input device is connected to the mobile terminal through a data line.

When a wireless connection condition is satisfied, the wireless communication module 122 may automatically form a wireless communication connection with the touch input device. Alternatively, the wireless communication connection with the touch input device may be formed when a specific type of a touch input is received by the touch screen. When a wireless communication function of the mobile terminal is not activated, the wireless communication module 122 may first activate the wireless communication function and then form the wireless communication connection with the touch input device. The specific type of the touch input may be basically set by a system, or the user may directly define the specific type of the touch input according to a use habit. For example, the specific type of the touch input may be set as touching the touch screen by the touch input device. That is, when the touch screen is touched by the touch input device, the wireless communication module 122 may automatically form the wireless communication connection with the touch input device.

The wireless communication module 122 may activate the wireless communication function of the mobile terminal, search for a touch input device capable of performing a wireless communication function, and form the wireless communication connection with the found touch input device after a connection command input by the user is received.

The touch screen 110 is configured to receive or detect the touch input by the touch input device. A touch input mode that detects only first to third touch inputs set by the system or defined by the user may be set through the operation of the mobile terminal or the touch input device.

The processor 130 may perform data transmission between the touch input device and the mobile terminal and may control an execution of an application in the mobile terminal.

When the first touch input by the touch input device is received by the touch screen, the processor 130 provides, to the touch input device, predetermined data associated with a first application that is currently being executed in the mobile terminal, such that the predetermined data is provided to another mobile terminal through the touch input device. Before the processor 130 transmits the predetermined data associated with the first application to the touch input device, the processor 130 may read the predetermined data from a predetermined position or a predetermined interface.

The first touch input may be basically set by the system, or the user may directly define the first touch input according to the use habit. In order to effectively distinguish the first touch input from a general touch input, the first touch input may be set as a touch gesture input. For example, the first touch input may be set as a touch gesture input having a shape of "C". Before the first touch input is input, a touch input mode for detecting the first touch input may be set.

According to an embodiment, the predetermined data associated with the first application may include at least one of an image or a text selected on an execution screen of the first application by the user, a file that is being edited in the first application, and a multimedia file that is being reproduced in the first application. For example, the image or the text selected on the execution screen of the first application by the user may be an image portion corresponding to a region selected in an image edited in an image edit application by the user, an image portion corresponding to a region selected on a currently displayed screen of an application by the user, and a text portion selected in a document edit application or a web browsing application by the user. The file that is being edited in the first application may be an image file that is being edited in an image edit application, a text file that is being edited in a document edit application, and a video file that is being edited in a video edit application. The multimedia file that is being reproduced in the first application may be an audio file that is being reproduced in an audio reproduction application and a video file that is being reproduced in a video reproduction application. However, the predetermined data associated with the first application is not limited to the above-described embodiment, and may include various data. According to an embodiment, the predetermined data associated with the first application may include link information for downloading installation data for installing a second application that is the same as the first application in another mobile terminal, and may include setting data for setting the second application that is the same as the first application in the other mobile terminal.

According to an embodiment, the predetermined data associated with the first application may be previously determined as consistent data according to the type of the first application. That is, predetermined data corresponding to different applications may also be different from each other. For example, when the first application that is currently being executed in the mobile terminal is a document edit application, the predetermined data associated with the first application may be determined as at least one of an image or a text selected on the execution screen of the first application by the user, a document file that is being edited in the first application, and setting data for setting a document edit environment in the same application as the first application. In addition, when the first application that is currently being executed is a web browsing application that is in a logged-in state, the predetermined data associated with the first application may be determined as data indicating information about an address of a current webpage of the first application and a logged-in account. However, the predetermined data associated with the first application is not limited to the above-described example, and may include various combinations of data.

According to an embodiment, when the first touch input is received by the touch screen, the processor 130 may control display of a list of the predetermined data associated with the first application on the touch screen and provide data selected from the displayed list by the user to the touch input device.

According to an embodiment, when the first touch input is received by the touch screen, the processor 130 may determine the type of the first touch input and provide the predetermined data corresponding to the first application and the determined type to the touch input device. The predetermined data corresponding to the first application may be previously determined as described above. In the predetermined data corresponding to the first application, when the first touch input is a first type, the processor 130 may transmit first data corresponding to the first type to the touch input device, and when the first touch input is a second type, the processor 130 may transmit second data corresponding to the second type to the touch input device. Therefore, the touch input device may store a plurality of data (the first data and the second data) transmitted from the mobile terminal. As an example, when the first application that is currently being executed in the mobile terminal is a document edit application, the user may select whether to transmit a document file that is being edited in the first application or whether to transmit setting data for setting a document edit environment of an application that is the same as the first application, according to the type of the touch input. That is, when the first touch input that is the first type is received by the touch screen, the processor 130 may transmit a document file that is being edited to the touch input device, and when the first touch input that is the second type is received by the touch screen, the processor 130 may transmit the setting data to the touch input device.

According to an embodiment, as a second touch input is input to another mobile terminal by the touch input device, the predetermined data provided to the touch input device may be transmitted from the touch input device to the other mobile terminal, and the transmitted predetermined data may be provided to a second application executed by the other mobile terminal. The second application may be the same application as the first application among applications installed on the other mobile terminal as described below. Alternatively, the second application may be an application capable of using data received from the touch input device among the applications installed on the other mobile terminal, or may be an application that is different from the first application.

According to an embodiment, when a third touch input by the touch input device is received by the touch screen, the processor 130 may receive the predetermined data provided to the touch input device from the touch input device, and provide the predetermined data received from the touch input device to a third application in the mobile terminal 100. That is, the predetermined data transmitted from the mobile terminal 100 to the touch input device may be transmitted again to not another mobile terminal but the same mobile terminal 100 and used in the third application. The third application may be the same application as the first application among applications installed on the mobile terminal 100. Alternatively, the third application may be an application capable of using data received from the touch input device among applications installed on the mobile terminal 100, or may be an application that is different from the first application.

Figure 2:
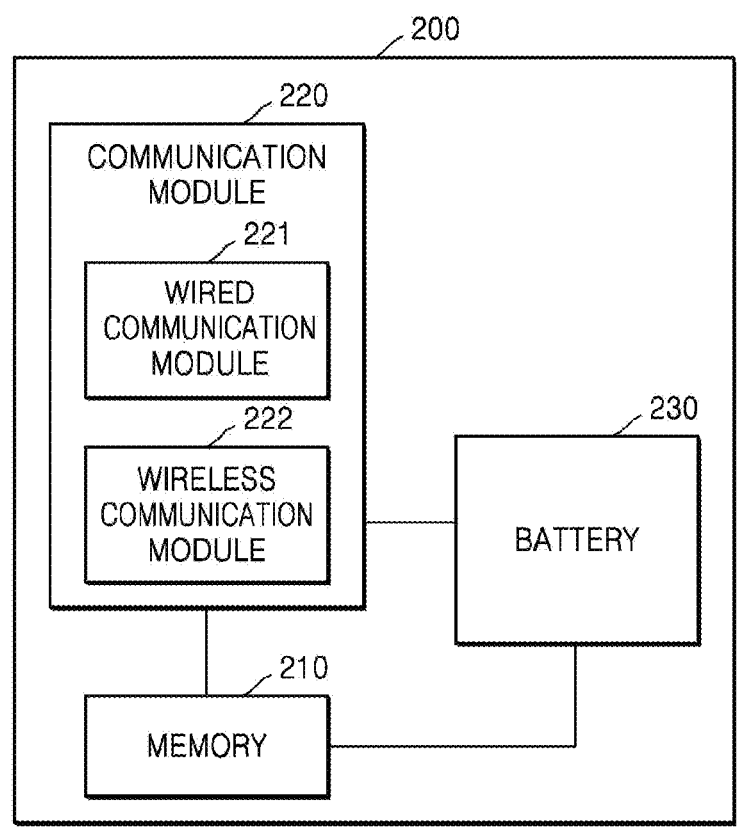
FIG. 2 is a block diagram illustrating an internal configuration of a touch input device according to an embodiment.

FIG. 2 is a block diagram illustrating the internal configuration of the touch input device according to an embodiment.

As illustrated in FIG. 2, the touch input device 200 may include a memory 210, a communication module 220, and a battery 230. The memory 210 in the touch input device 200 is configured to store data. The touch input device 200 may further include a control button for controlling operations of the components in the outside thereof, and various functions such as a function of setting a touch input mode for detecting first to third touch inputs may be executed through the control button.

The memory 210 included in the touch input device 200 may be a non-plug-type storage device or a plug-type storage device. The communication module 220 in the touch input device 200 is configured to transmit and receive data through a communication connection with the mobile terminal. The communication module 220 may include a wired communication module 221 and/or a wireless communication module 222. The wireless communication module 222 may form a wireless communication connection with another device through any wireless connection. For example, the wireless communication module 222 may form the wireless communication connection with another device through Wi-Fi connection, Bluetooth (BT) connection, near-field communication (NFC) connection, or touch screen communication (HOTKNOT) connection. The touch input device 200 may exchange data with the mobile terminal through the wired communication module 221 or the wireless communication module 222.

According to an embodiment, the touch input device 200 may provide data received from a first mobile terminal to a second mobile terminal. Specifically, as a first touch input is input to the first mobile terminal by the touch input device 200, predetermined data associated with a first application that is being executed in the first mobile terminal may be received from the first mobile terminal and stored in the touch input device 200, and as a second touch input is input to the second mobile terminal by the touch input device 200, the received predetermined data may be provided to the second mobile terminal.

According to an embodiment, the touch input device 200 may be a stylus pen 300 as described with reference to FIG. 3. However, the touch input device 200 is not limited thereto and may be various types of devices for generating the touch input.

Figure 3:
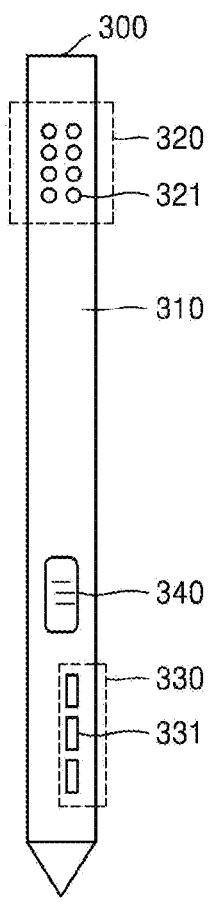
FIG. 3 is a diagram illustrating a configuration of a stylus pen according to an embodiment.

FIG. 3 is a schematic diagram illustrating the configuration of the stylus pen according to an embodiment.

As illustrated in FIG. 3, the stylus pen 300 may include a pen body 310, a data transmission interface 320, a charge interface 330, and a control button 340. As described above, various functions of the stylus pen 300 may be executed through the control button 340. In order to smoothly perform a communication connection between the stylus pen 300 and the mobile terminal, a data line and a control line in the wired communication module 221 may be integrated in the data transmission interface 320 disposed on the pen body 310.

According to an embodiment, as illustrated in FIG. 3, the data transmission interface 320 disposed on the pen body 310 may be a plurality of metal contact points 321 exposed on the pen body 310. However, the configuration of the data transmission interface 320 is not limited to the metal contact points 321 illustrated in FIG. 3, and may be another type of a metal connector. The metal contact points 321 may be formed by inserting a metal plate into the pen body 310, spraying a conductive material to the pen body 310, or attaching a conductive material to the pen body 310.

The stylus pen 300 may include the battery 230 so as to supply power thereto. In order to charge the battery 230, the stylus pen 300 may further include a charge module used to charge the battery 230 with power received from the outside. The charge module may perform a charge operation through the charge interface 330 or the data transmission interface 320. The charge interface 330 may be disposed on the pen body 310. In order to facilitate a charge operation and prevent an arbitrary contact of the charge interface 330, a plurality of invaginated metal contact points 331 may be set on the pen body 310.

Figure 4:
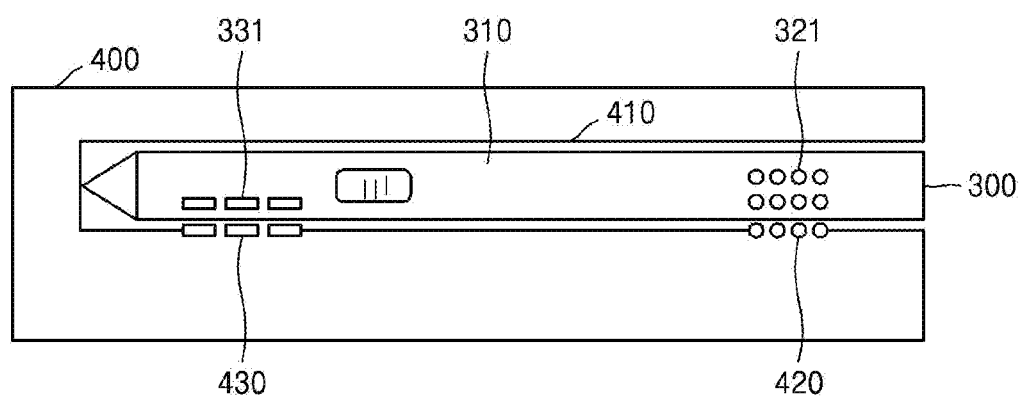
FIG. 4 is a diagram illustrating a structure in which the stylus pen according to an embodiment is inserted into the mobile terminal.

FIG. 4 is a diagram illustrating a structure in which the stylus pen according to the embodiment is inserted into the mobile terminal.

The mobile terminal 400 according to the embodiment may include a pen insertion hole 410 for insertion of the stylus pen 300. In addition, a data transmission interface 420 and a power supply interface 430 may be provided in the pen insertion hole 410. As illustrated in FIG. 4, when the stylus pen 300 is inserted into the pen insertion hole 410 of the mobile terminal 400, a position of the data transmission interface 320 of the stylus pen 300 may correspond to a position of the data transmission interface 420 in the pen insertion hole 410 of the mobile terminal 400, such that the data transmission interface 320 of the stylus pen 300 is connected to the data transmission interface 420 in the pen insertion hole 410. In the same manner, when the stylus pen 300 is inserted into the pen insertion hole 410 of the mobile terminal 400, a position of the charge interface 330 of the stylus pen 300 may correspond to a position of the power supply interface 430 in the pen insertion hole 410 of the mobile terminal 400, such that the charge interface 330 of the stylus pen 300 is connected to the power supply interface 430 in the pen insertion hole 410. The power supply interface 430 in the pen insertion hole 410 of the mobile terminal 400 may be set as a plurality of elastic contact points capable of supplying power.

Figure 5:
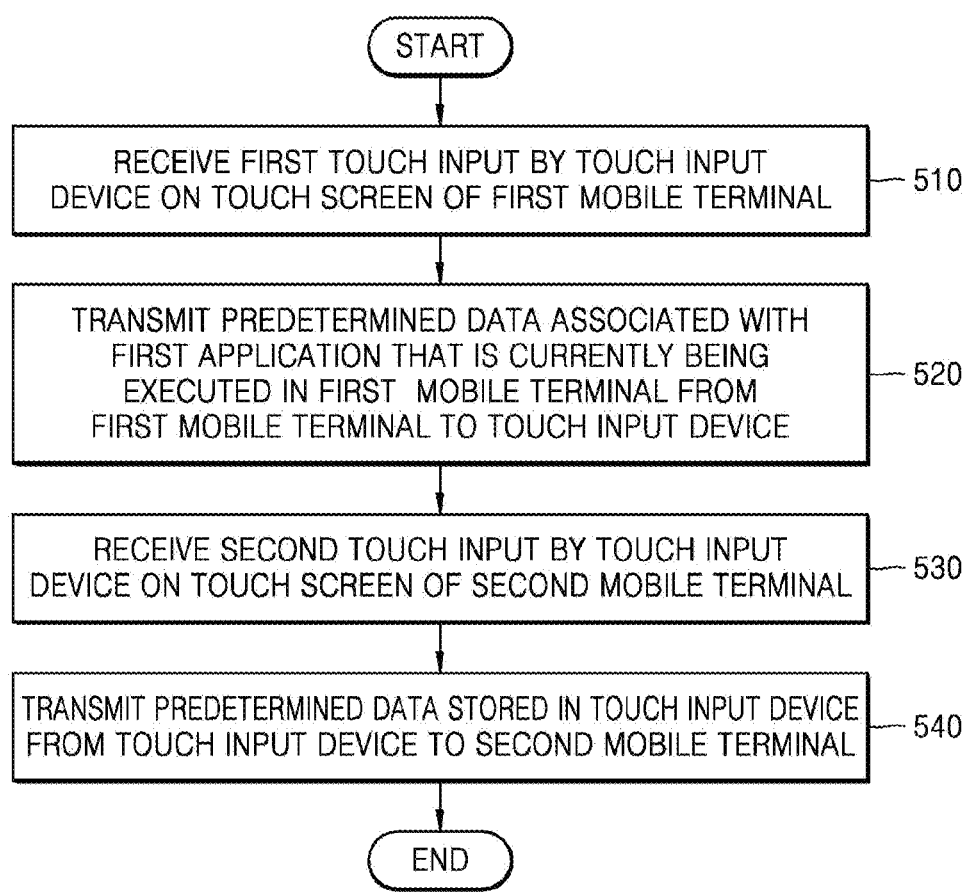
FIG. 5 is a flowchart of a method of controlling a mobile terminal by using a touch input device, according to an embodiment.

FIG. 5 is a flowchart of a method of controlling a mobile terminal by using a touch input device, according to an embodiment.

As illustrated in FIG. 5, the method of controlling the mobile terminal by using the touch input device may include: receiving a first touch input by the touch input device on a touch screen of a first mobile terminal (510); transmitting predetermined data associated with a first application that is currently being executed in the first mobile terminal from the first mobile terminal to the touch input device (520); receiving a second touch input by the touch input device on a touch screen of a second mobile terminal (530); and transmitting predetermined data stored in the touch input device from the touch input device to the second mobile terminal (540).

In operation 510, the first mobile terminal receives the first touch input by the touch input device on the touch screen of the first mobile terminal. In operation 520, the first mobile terminal transmits the predetermined data associated with the first application that is currently being executed in the first mobile terminal to the touch input device through the communication connection with the touch input device in response to the reception of the first touch input.

According to an embodiment, when the first touch input is received by the touch screen, the first mobile terminal may determine the type of the first touch input and provide the predetermined data corresponding to the first application and the determined type to the touch input device. The predetermined data corresponding to the first application may be previously determined according to the type of the first application as described above. For example, in the predetermined data corresponding to the first application, when the first touch input is a first type, the first mobile terminal may transmit first data corresponding to the first type to the touch input device, and when the first touch input is a second type, the first mobile terminal may transmit second data corresponding to the second type to the touch input device. Therefore, the touch input device may store a plurality of data (the first data and the second data) transmitted from the first mobile terminal.

In operations 510 and 520, the same operations as those of the mobile terminal 100 and the touch input device 200 described with reference to FIGS. 1B to 4 may be performed by the first mobile terminal and the touch input device.

In operation 530, the second mobile terminal receives the second touch input by the touch input device on the touch screen of the second mobile terminal.

The second touch input may be basically set by the system, or the user may directly define the second touch input according to the use habit. In order to effectively distinguish the second touch input from a general touch input, the second touch input may be set as a touch gesture input. For example, the second touch input may be set as a touch gesture input having a shape of "P". Before the second touch input is input to the touch screen, a touch input mode for detecting the second touch input may be set in the mobile terminal.

In operation 540, the predetermined data stored in the touch input device is transmitted from the touch input device to the second mobile terminal. That is, the second mobile terminal receives the predetermined data stored in the touch input device from the touch input device through the communication connection with the touch input device in response to the reception of the second touch input.

According to an embodiment, when the second touch input is received by the touch screen, the second mobile terminal may determine the type of the second touch input and receive the predetermined data corresponding to the determined type from the touch input device. For example, in a case where the plurality of data (the first data and the second data) transmitted from the first mobile terminal are stored in the touch input device, the second mobile terminal may receive the first data from among the data stored in the touch input device when the second touch input is a third type, and may receive the second data from among the data stored in the touch input device when the second touch input is a fourth type.

According to an embodiment, when the second touch input is received by the touch screen, the second mobile terminal may receive predetermined data that is stored latest in the touch input device and has not been transmitted to the mobile terminal. In this case, by inputting the second touch input a plurality of times, the second mobile terminal may receive predetermined data stored in the touch input device at different moments in the reverse order of the storage time. The data that has been transmitted to the mobile terminal among the data stored in the memory of the touch input device may be deleted from the memory of the touch input device.

In operation 540, the predetermined data that has been transmitted from the touch input device to the second mobile terminal may be provided to the second application executed by the second mobile terminal. The second application may be the same application as the first application among applications installed on the second mobile terminal. Alternatively, the second application may be an application capable of using data received from the touch input device among the applications installed on the second mobile terminal, or may be an application that is different from the first application. Alternatively, the second application may be an application that is different from the first application, but is capable of performing a predetermined process by using the data received from the touch input device. For example, when the data received from the touch input device is data including an image selected by the user, the second application may be an application capable of pasting the corresponding image just like an image edit application, and when the data received from the touch input device is a document file, the second application may be a document edit application capable of opening and editing the corresponding document file or a document viewer application capable of opening and viewing the corresponding document file.

According to an embodiment, the predetermined data transmitted from the first mobile terminal to the second mobile terminal through the touch input device may include data indicating the state of the first application when the first touch input is received by the touch screen, and the state of the second application may be made substantially identical to the state of the first application by using the predetermined data provided to the second application.

According to an embodiment, the predetermined data transmitted from the first mobile terminal to the second mobile terminal through the touch input device may include link information for downloading installation data for installing the second application that is the same as the first application, and the second application may be installed on the second mobile terminal by using the installation data.

According to an embodiment, the predetermined data transmitted from the first mobile terminal to the second mobile terminal through the touch input device may include setting data for setting the second application that is the same as the first application, and the second application may be set in the same manner as in the first application by providing the setting data to the second application.

According to an embodiment, when the third touch input by the touch input device is received by the touch screen of the first mobile terminal after the predetermined data is transmitted from the first mobile terminal to the touch input device, the predetermined data transmitted from the first mobile terminal to the touch input device may be transmitted to the first mobile terminal and provided to the third application in the first mobile terminal.

According to an embodiment, the first application may be a web browsing application, and predetermined data provided from the first mobile terminal to the second mobile terminal through the touch input device may include an address of a current webpage of the first application. The predetermined data may be provided to the second application that is the web browsing application, and a webpage corresponding to the address of the current webpage may be opened in the second application.

According to an embodiment, in a case where the first application has a multimedia reproduction function and multimedia is paused in the first application when the first touch input is received by the touch screen, predetermined data provided from the first mobile terminal to the second mobile terminal through the touch input device may include data indicating a reproduction state of the multimedia and a reproduction position at which the multimedia is paused. The predetermined data may be provided to the second application having the multimedia reproduction function, and the reproduction of the multimedia may be started in the second application in the paused state at the reproduction position.

According to an embodiment, in a case where the first application is a game application and a game is paused in the first application when the first touch input is received by the touch screen, predetermined data provided from the first mobile terminal to the second mobile terminal through the touch input device may include data indicating a progress state of the game and a position at which the game is paused. The predetermined data may be provided to the second application that is the same as the first application, and the game may be started in the second application in the paused state at the above position.

According to an embodiment, when the first application has an account login function and an account is logged into in the first application when the first touch input is received by the touch screen, predetermined data provided from the first mobile terminal to the second mobile terminal through the touch input device may include data indicating information about the logged-in account, and the account may be logged into in the second application by providing the predetermined data to the second application that is the same as the first application.

According to an embodiment, the first application may have a multimedia streaming function, and predetermined data provided from the first mobile terminal to the second mobile terminal through the touch input device may include a network address of the multimedia that is being streamed in the first application. The predetermined data may be provided to the second application that is the same as the first application, and the multimedia corresponding to the network address may be streamed in the second application.

In operations 530 and 540, the same operations as those of the mobile terminal 100 and the touch input device 200 described with reference to FIGS. 1B to 4 may be performed by the second mobile terminal and the touch input device.

According to an embodiment, the method of controlling the mobile terminal by using the touch input device may further include, in a case where the second application is not executed in the second mobile terminal when the second touch input is received by the touch screen, executing the second application before the data received from the touch input device is provided to the second application.

Specific embodiments related to the method of transmitting data between the first mobile terminal and the second mobile terminal through the touch input device and continuously executing the application will be described with reference to FIGS. 6 to 23.

A case where the predetermined data associated with the first application is provided from the first mobile terminal to the second application of the second mobile terminal through the touch input device will be described with reference to FIGS. 6 to 23, but the present invention is not limited thereto. For example, after the predetermined data associated with the first application is provided to the touch input device, the predetermined data associated with the first application may be provided from the touch input device to the third application installed on the first mobile terminal.

Figure 6:
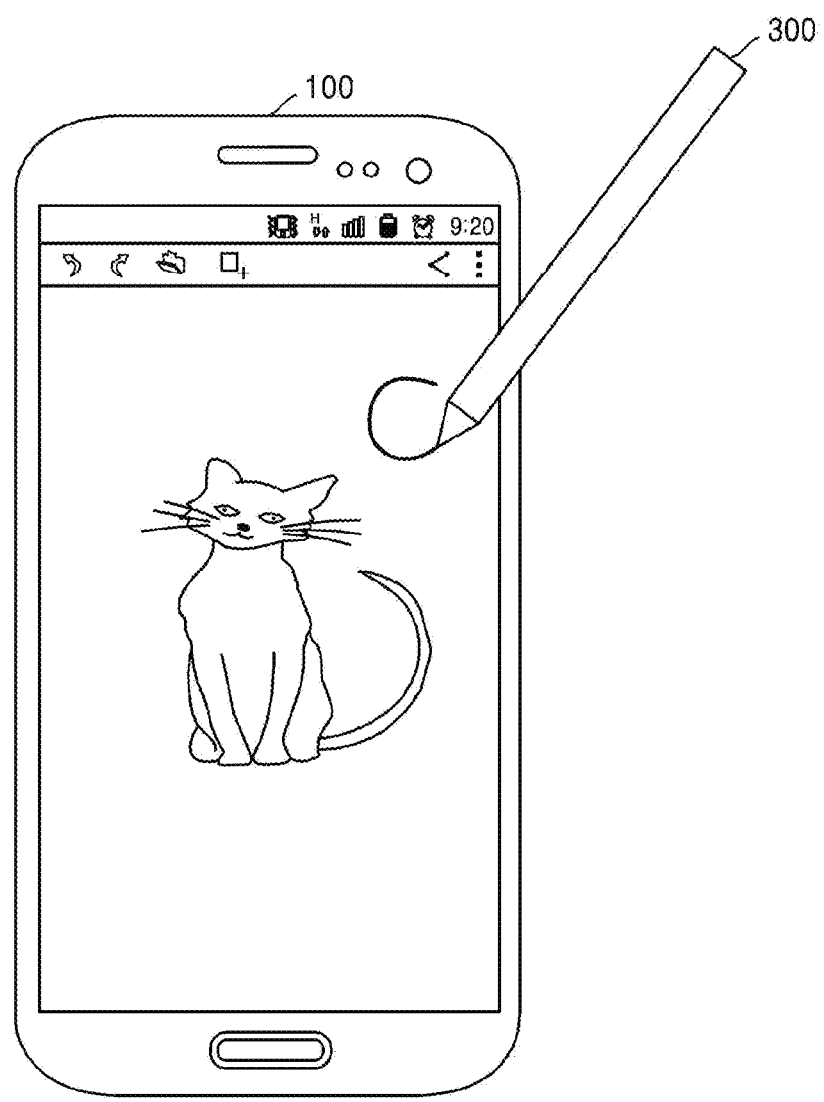
FIGS. 6 to 8 illustrate transmission and invoking of an image by using the stylus pen, according to an embodiment.
Figure 7:
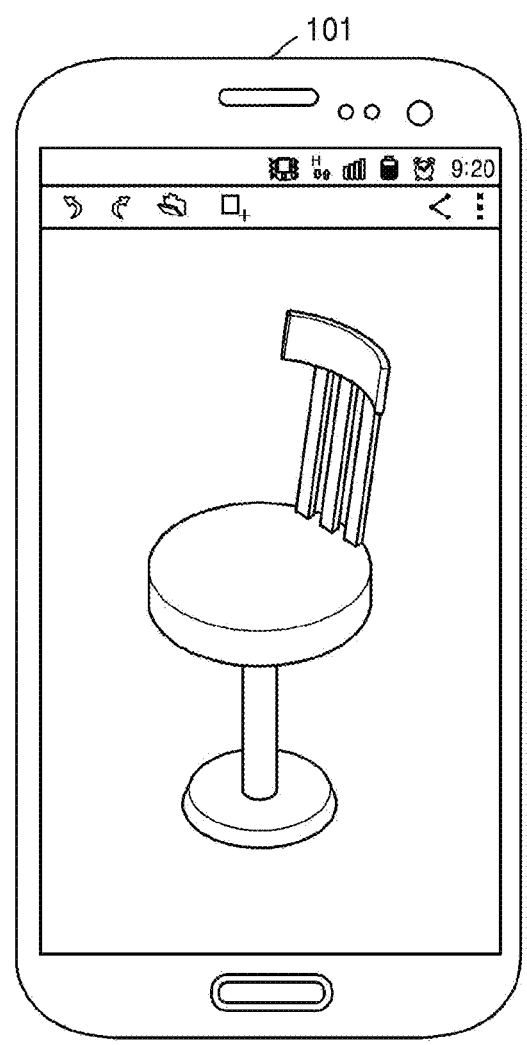
Figure 8:
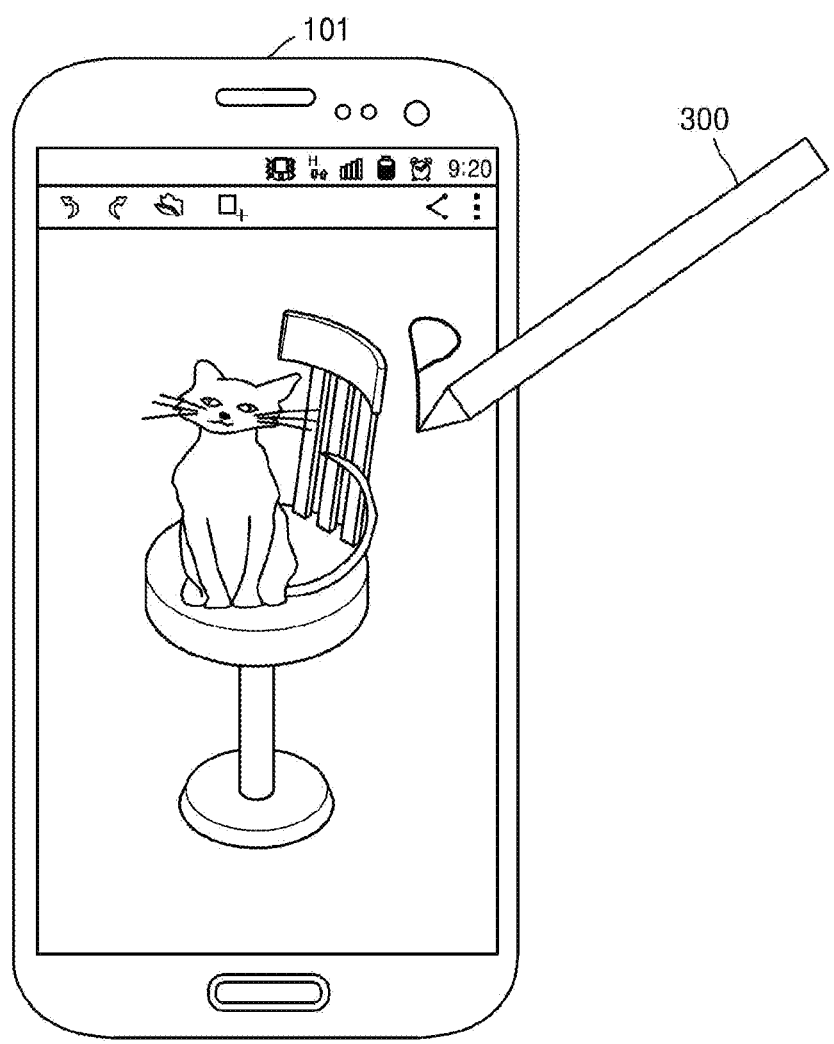

FIGS. 6 to 8 illustrate transmission and invoking of an image by using the stylus pen 300, according to an embodiment.

Referring to FIG. 6, an image edit application is executed in the first mobile terminal 100, a cat image is selected by the operation of the stylus pen 300, and a touch gesture input (first touch input) having a shape of "C" is input on the touch screen by the stylus pen 300. Therefore, the first mobile terminal 100 transmits the cat image to the stylus pen 300 through the wireless communication connection.

Referring to FIG. 7, an image edit application is executed in the second mobile terminal, and an existing chair image exists in the image edit application.

Referring to FIG. 8, a touch gesture input (second touch input) having a shape of "P" is input on the touch screen of the second mobile terminal by the stylus pen 300, and the second mobile terminal receives the cat image stored in the stylus pen 300 from the stylus pen 300 through the wireless communication connection. The received data is provided to the image edit application that is being executed in the second mobile terminal, and the cat image is pasted on an existing desk image in the image edit application.

Referring to FIGS. 6 to 8, in an embodiment, the image selected by the user may be stored in stylus pen 300 in real time, and the image may be continuously used in another mobile terminal or the same mobile terminal.

Figure 9:
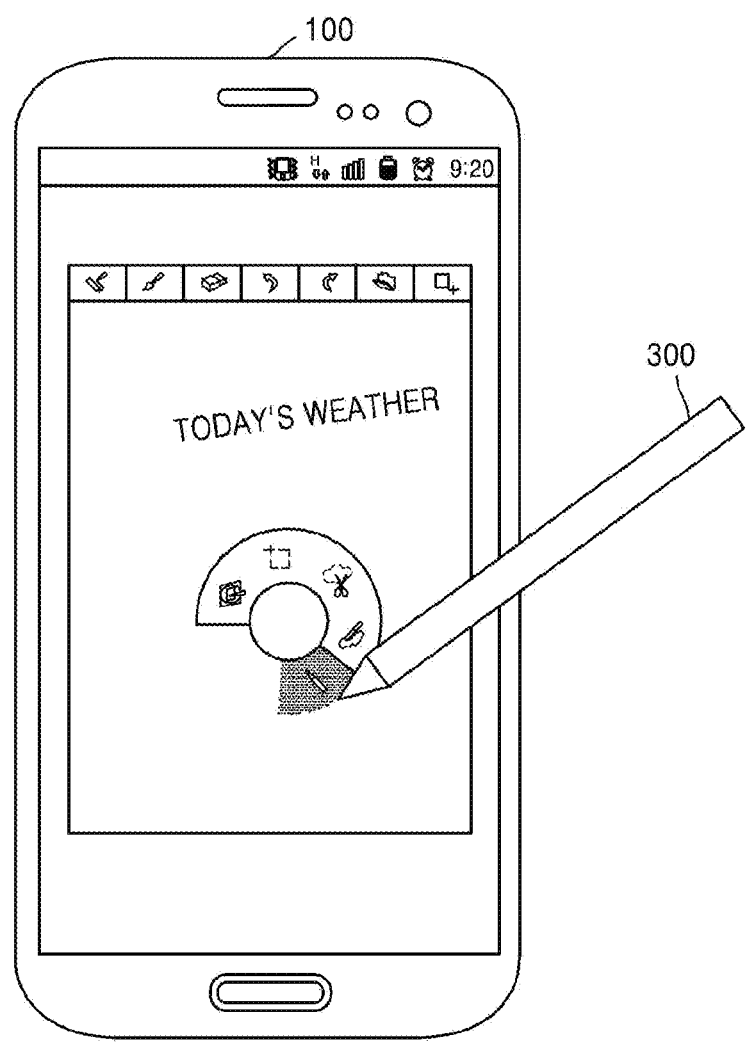
FIGS. 9 to 11 illustrate transmission and invoking of a document file that is being edited in a memo application by using the stylus pen, according to an embodiment.
Figure 10:
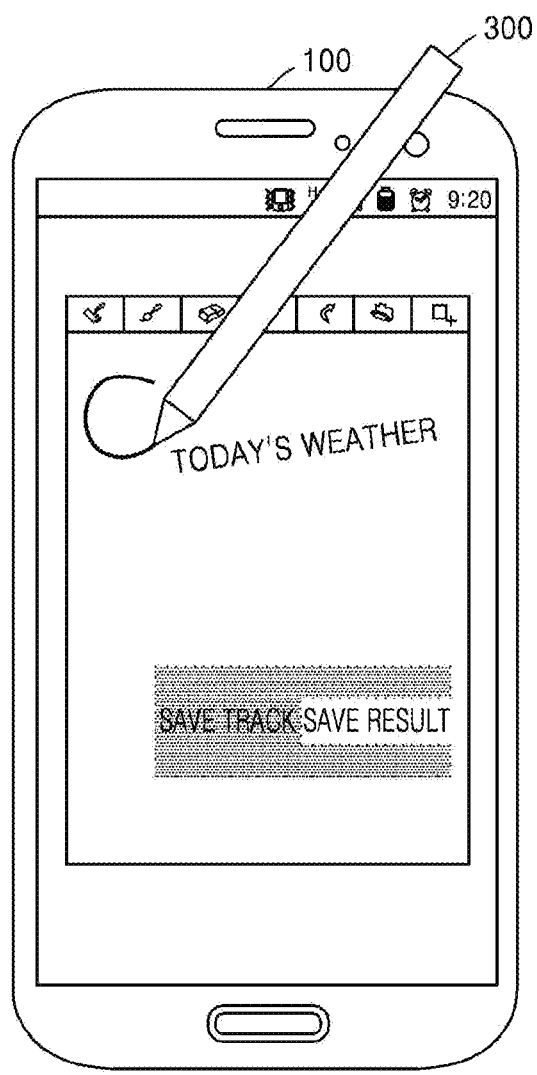
Figure 11:
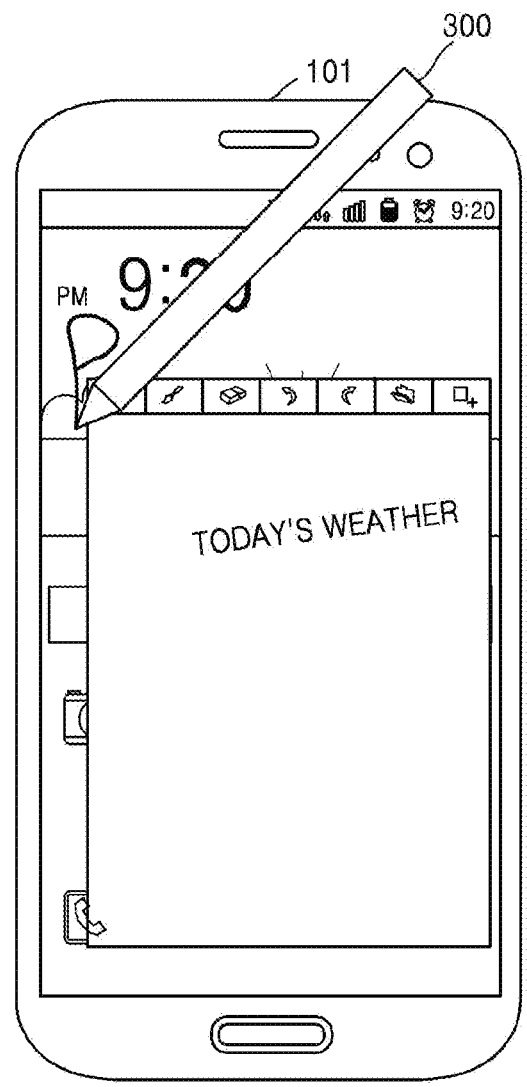

FIGS. 9 to 11 illustrate transmission and invoking of a document file that is being edited in a memo application by using the stylus pen 300, according to an embodiment.

Referring to FIG. 9, after a text "TODAY'S WEATHER" is input in the memo application of the first mobile terminal 100, a touch input mode for detecting a first touch input is selected on a pop-up menu by the stylus pen 300.

Referring to FIG. 10, a touch gesture input (first touch input) having a shape of "C" is input on the touch screen of the first mobile terminal by the stylus pen 300, and a list of predetermined data associated with the memo application is displayed so as to select data transmitted to the stylus pen 300. The list includes two items "SAVE TRACK" and "SAVE RESULT". In the two items, "SAVE TRACK" represents transmission of setting data for setting a document edit environment of the memo application, and "SAVE RESULT" represents transmission of the document file that is being edited in the memo application. In the list of the predetermined data associated with the memo application, "SAVE RESULT" is selected by the user, and the first mobile terminal 100 transmits the document file that is being edited in the memo application to the stylus pen 300 through the wireless communication connection.

Referring to FIG. 11, a touch gesture input (second touch input) having a shape of "P" is input on the touch screen in the main interface of the second mobile terminal by the stylus pen 300, and the second mobile terminal 101 receives the document file stored in the stylus pen 300 through the wireless communication connection. Since the memo application is not executed in the second mobile terminal 101 when the second touch input is input in the second mobile terminal 101, the second mobile terminal 101 first executes the memo application and then loads the document file received from the stylus pen 300 in the memo application.

Referring to FIGS. 9 to 11, in an embodiment, the document file that is being edited may be transmitted to the stylus pen 300, and the continuous document edit may be performed in another mobile terminal or the same mobile terminal.

Figure 12:
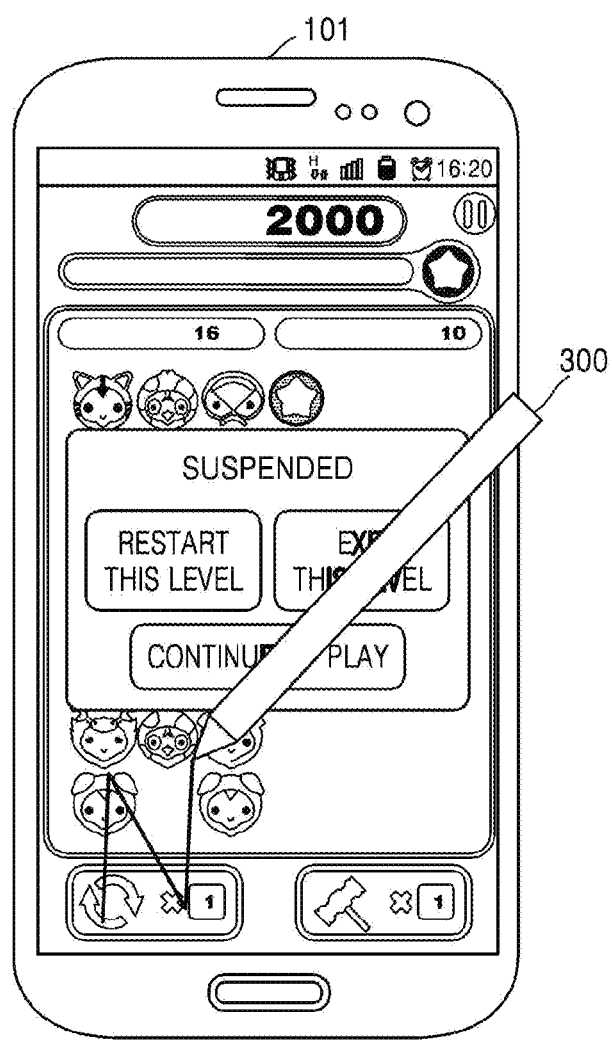
FIGS. 12 to 14 illustrate continuous execution of a game application by using the stylus pen, according to an embodiment.
Figure 13:
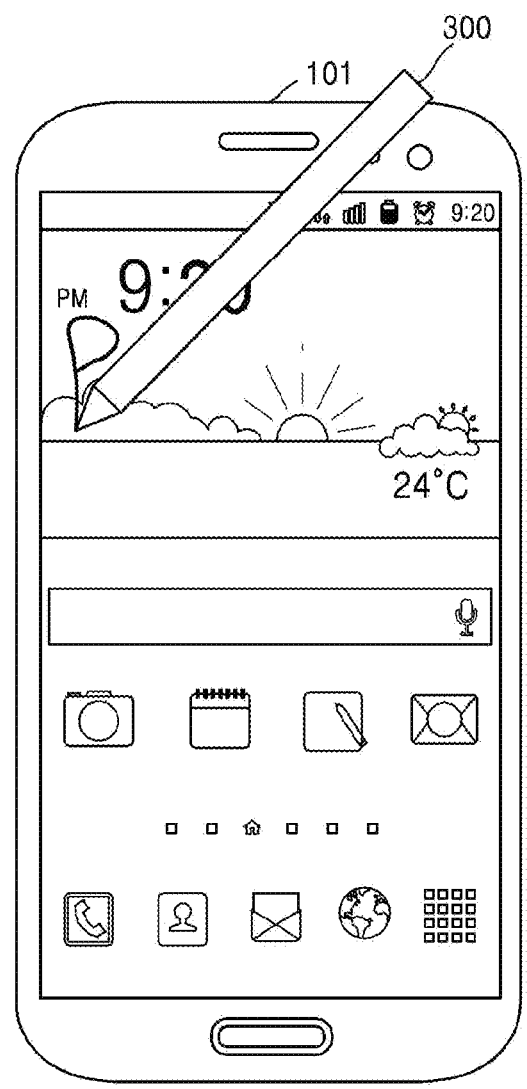
Figure 14:
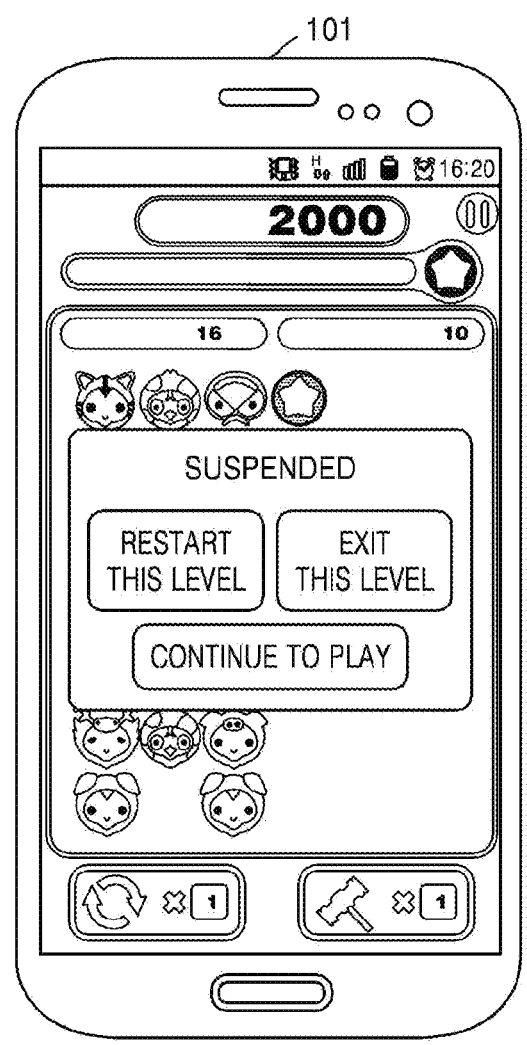

FIGS. 12 to 14 illustrate continuous execution of a game application by using the stylus pen 300, according to an embodiment.

Referring to FIG. 12, a game is paused in the game application that is being executed in the first mobile terminal 100, and a touch gesture input (first touch input) having a shape of "N" is input on the touch screen by the stylus pen 300. Therefore, the first mobile terminal 100 transmits a progress state of the game and a paused position of the game to the stylus pen 300 through the wireless communication connection.

Referring to FIG. 13, a touch gesture input (second touch input) having a shape of "P" is input on the touch screen in the main interface of the second mobile terminal 101 by the stylus pen 300, and the second mobile terminal 101 receives data indicating the progress state of the game and the paused position of the game, which is stored in the stylus pen 300, from the stylus pen 300 through the wireless communication connection.

Referring to FIG. 14, the game application is executed in the second mobile terminal 101, the data received from the stylus pen 300 is provided to the game application, and the game is started in the paused state at the position at which the game has been paused in the first mobile terminal. The user may select "CONTINUE TO PLAY" in the interface of the game application so as to continue to play the game.

Referring to FIGS. 12 to 14, in an embodiment, the user may continue to play the paused game in another terminal or the same terminal by using the stylus pen 300.

Figure 15:
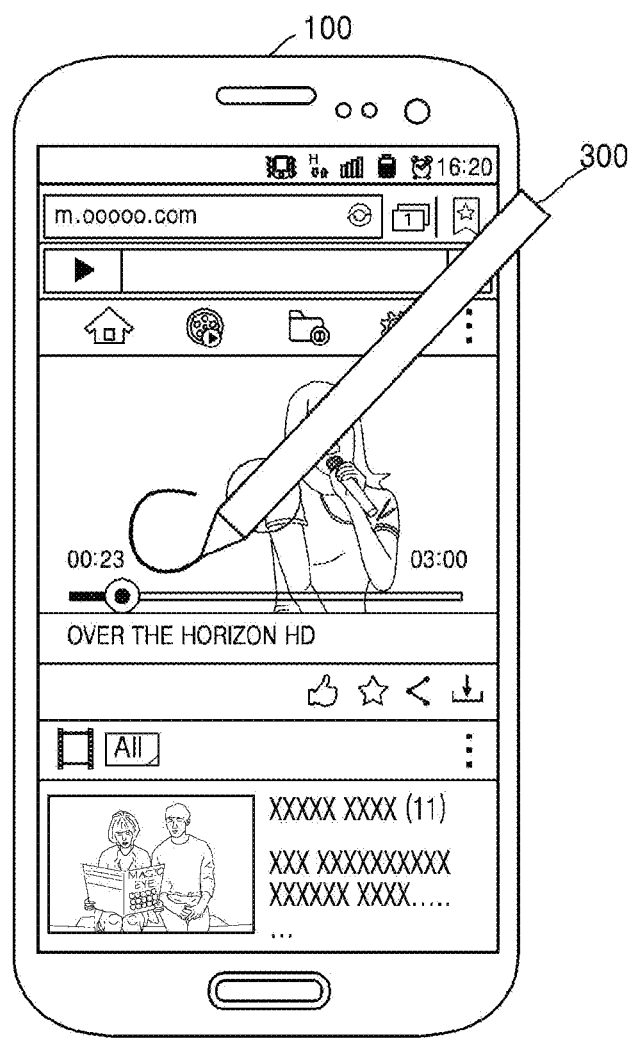
FIGS. 15 to 17 illustrate continuous execution of a video streaming application by using the stylus pen, according to an embodiment.
Figure 16:
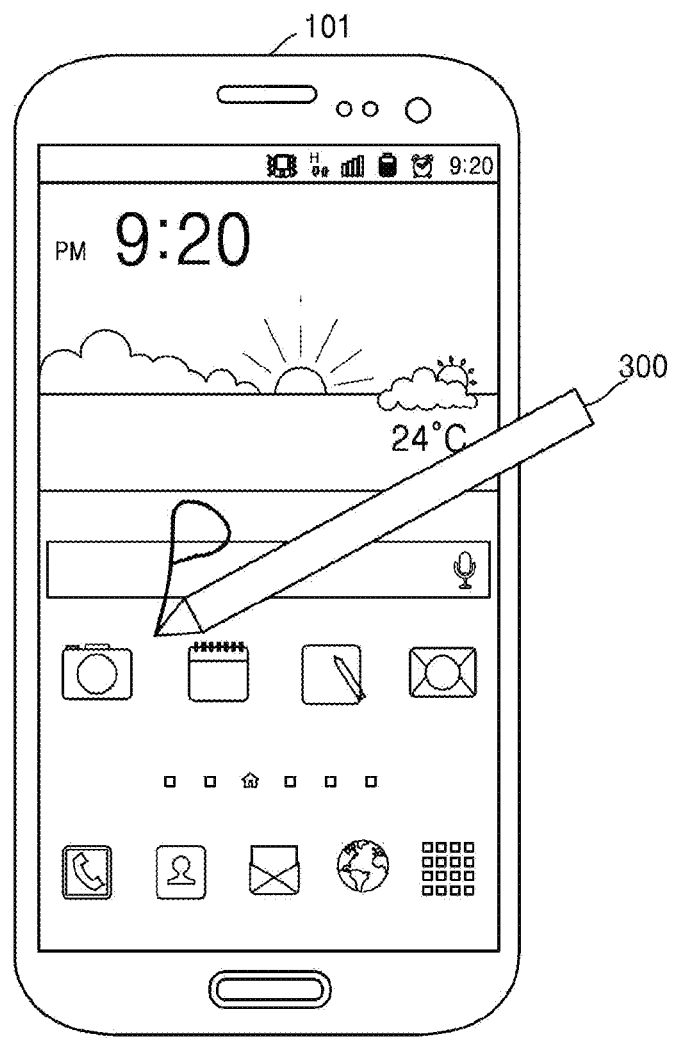
Figure 17:
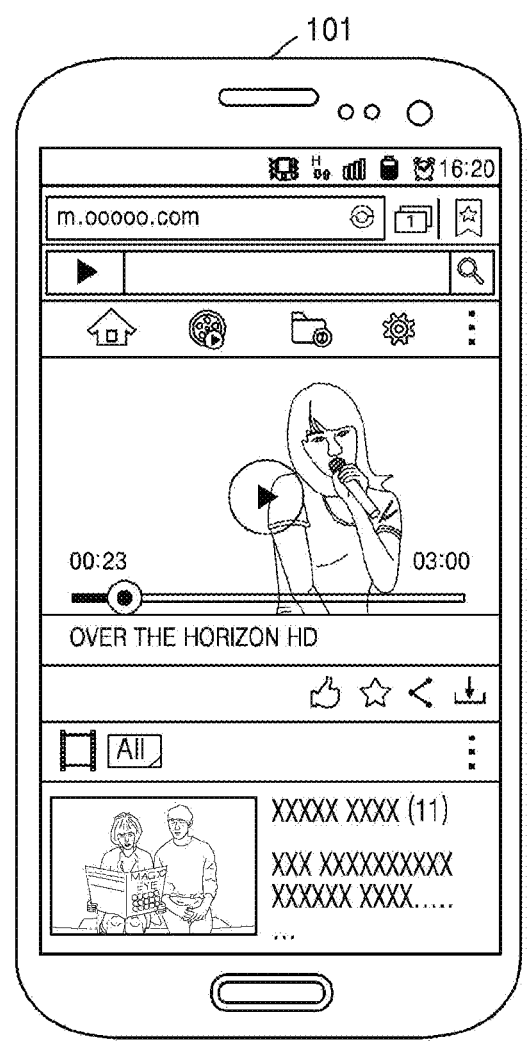

FIGS. 15 to 17 illustrate continuous execution of a video streaming application by using the stylus pen 300, according to an embodiment.

Referring to FIG. 15, video streaming is paused in the video streaming application in the first mobile terminal 100, and a touch gesture input (first touch input) having a shape of "C" is input on the touch screen by the stylus pen 300. The first mobile terminal 100 transmits data indicating the reproduction state of the video and the paused reproduction position of the video to the stylus pen 300 through the wireless communication connection, together with the network address of the video that is being streamed.

Referring to FIG. 16, a touch gesture input (second touch input) having a shape of "P" is input on the touch screen in the main interface of the second mobile terminal 101 by the stylus pen 300, and the second mobile terminal 101 receives, from the stylus pen 300, data indicating the network address of the multimedia that is being streamed, the reproduction state of the video, and the paused position of the video, which is stored in the stylus pen 300, through the wireless communication connection.

Referring to FIG. 17, since the video streaming application is not executed when the second touch input is input in the second mobile terminal 101, the video streaming application is first executed in the second mobile terminal. The second mobile terminal 101 provides data received from the stylus pen 300 to the video streaming application. The multimedia corresponding to the network address is streamed in the video streaming application based on the provided data, and the reproduction of the multimedia is started in the paused state at the reproduction position. In order to continuously continue to reproduce the video, the user may click a reproduction restart button in the interface of the video streaming application.

Referring to FIGS. 15 to 17, in an embodiment, the user may continue to stream the video in another mobile terminal or the same mobile terminal by using the stylus pen 300.

Figure 18:
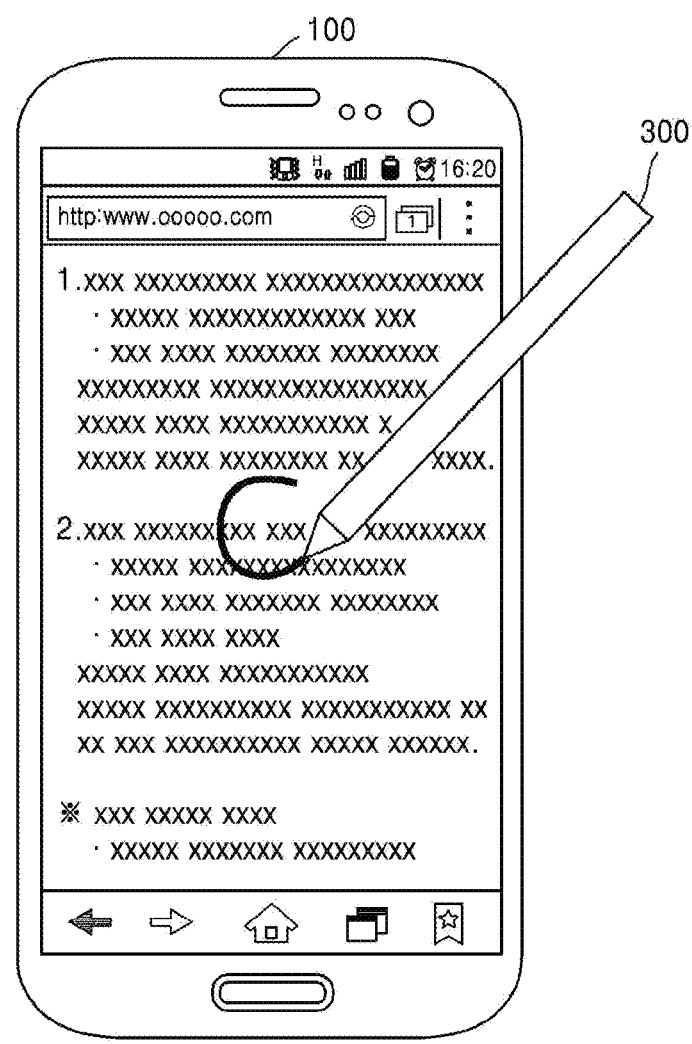
FIGS. 18 to 20 illustrate continuous execution of a web browsing application by using the stylus pen, according to an embodiment.
Figure 19:
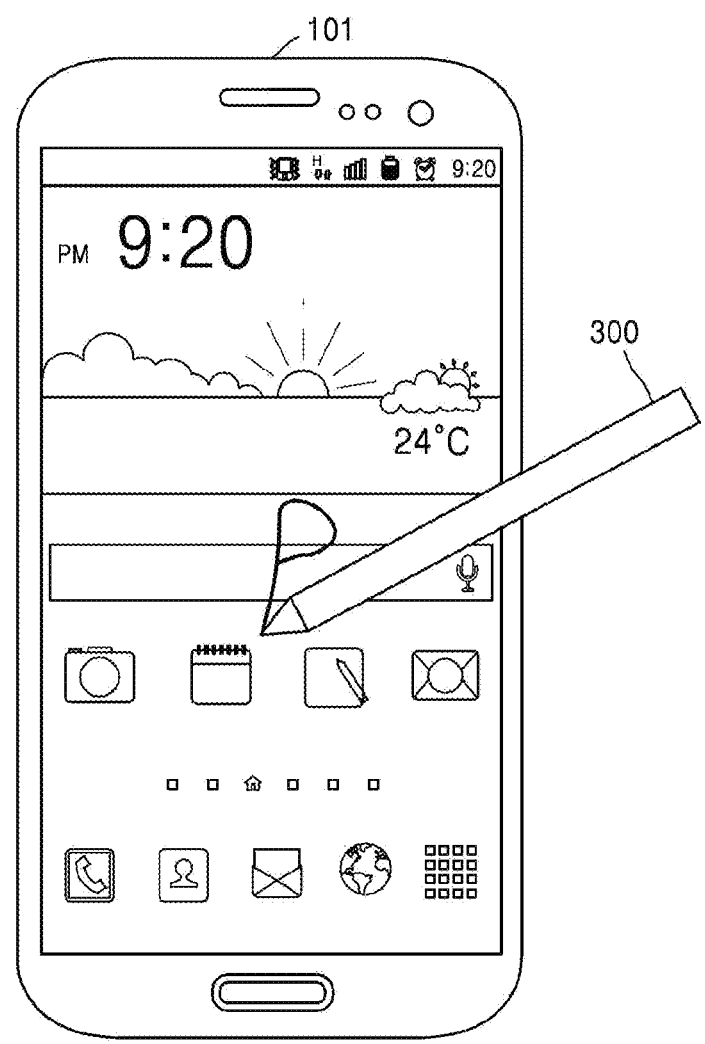
Figure 20:
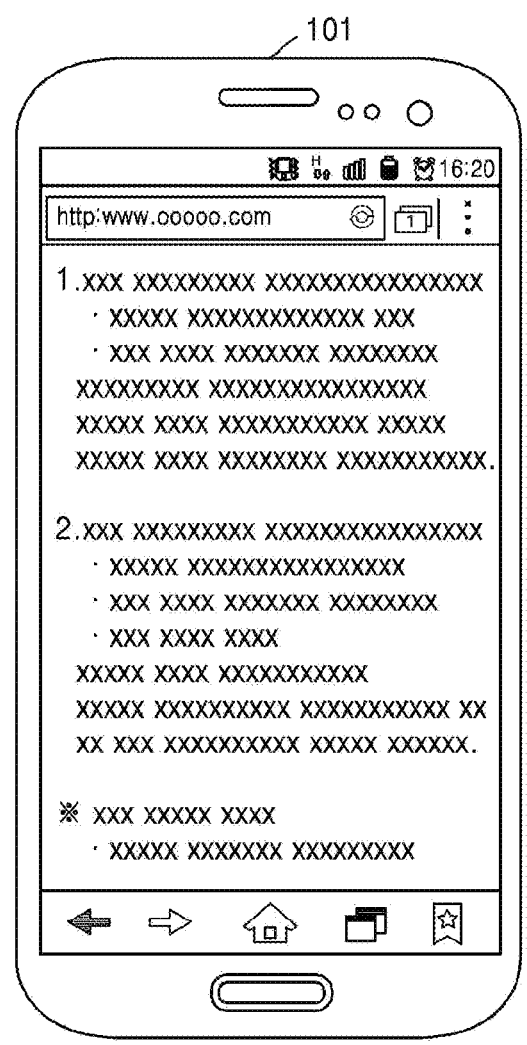

FIGS. 18 to 20 illustrate continuous execution of a web browsing application by using the stylus pen 300, according to an embodiment.

Referring to FIG. 18, a current webpage of the web browsing application is displayed on the first mobile terminal 100, and a touch gesture input (first touch input) having a shape of "C" is input on the touch screen by the stylus pen 300. Therefore, the first mobile terminal 100 transmits an address of the current webpage to the stylus pen 300 through the wireless communication connection.

Referring to FIG. 19, a touch gesture input (second touch input) having a shape of "P" is input on the touch screen in the main interface of the second mobile terminal 101 by the stylus pen 300, and the second mobile terminal 101 receives the address of the webpage stored in the stylus pen 300 through the wireless communication connection.

Referring to FIG. 20, since the web browsing application is not executed when the second touch input is input in the second mobile terminal 101, the web browsing application is first executed in the second mobile terminal 101. The second mobile terminal 101 provides the data received from the stylus pen 300 to the executed web browsing application, and a webpage corresponding to the address of the current webpage is opened in the web browsing application.

Referring to FIGS. 18 to 20, in an embodiment, the current webpage of the web browsing application may be continuously used by using the stylus pen 300.

Figure 21:
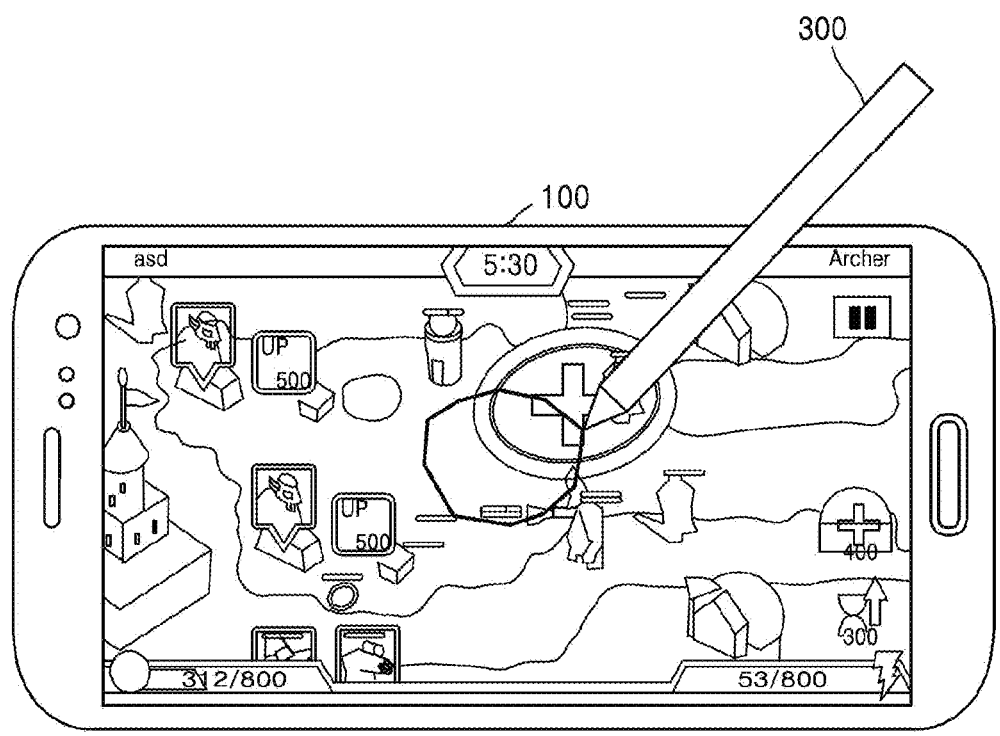
FIGS. 21 to 23 illustrate continuous execution of a game application having an account login function by using the stylus pen, according to an embodiment.
Figure 22:
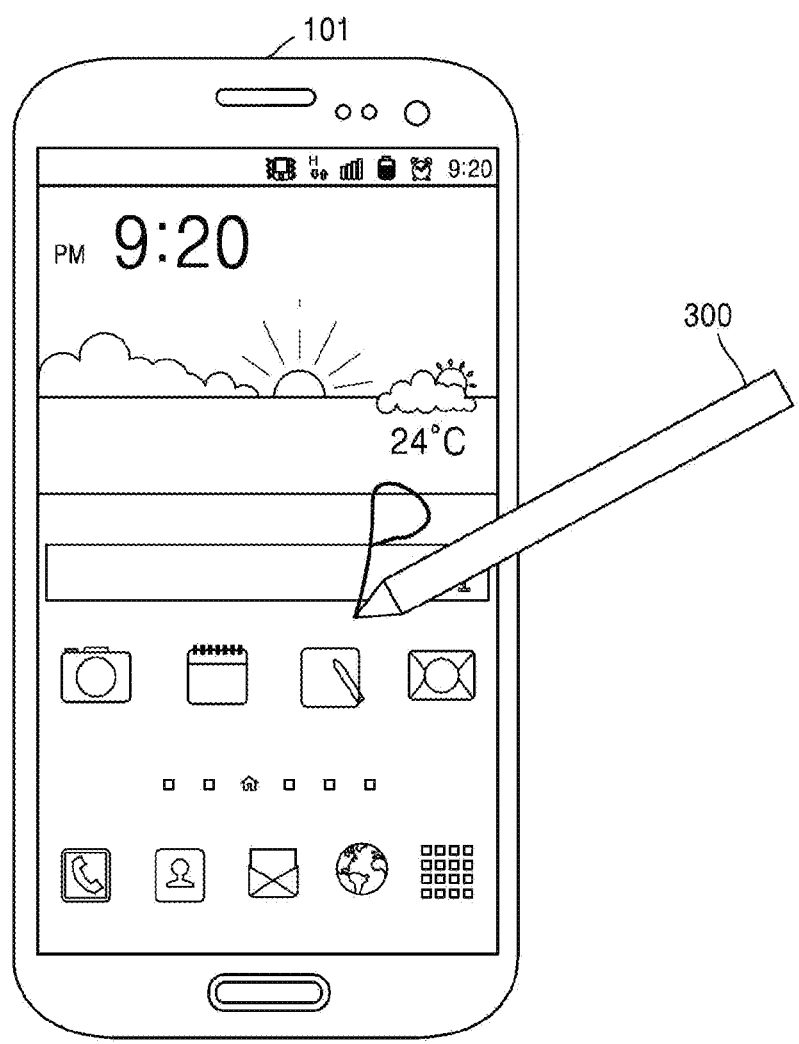
Figure 23:
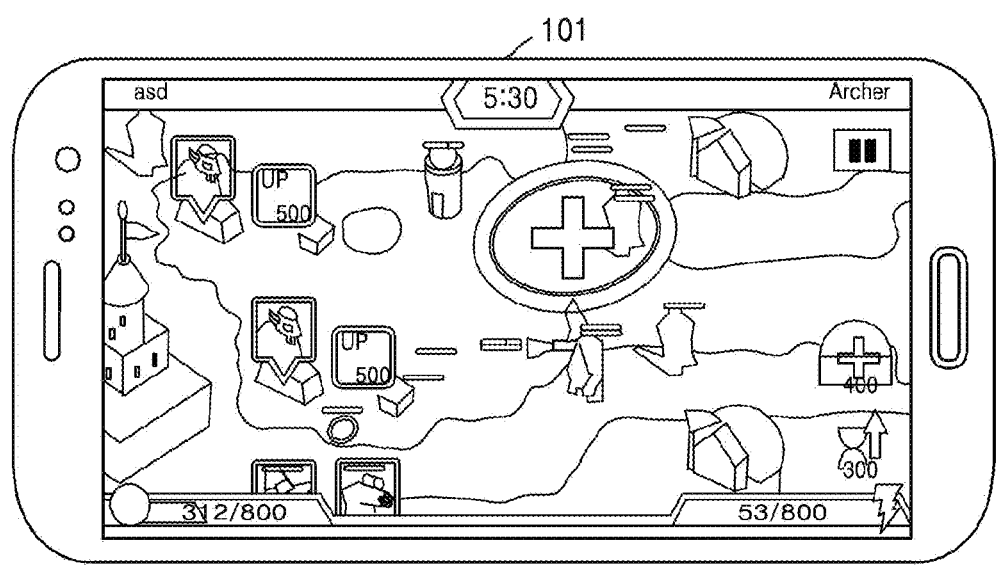

FIGS. 21 to 23 illustrate continuous execution of a game application having an account login function by using the stylus pen 300, according to an embodiment.

Referring to FIG. 21, a game is paused in the game application that is executed in the first mobile terminal 100 and is in a logged-in state, and a touch gesture input (first touch input) having a shape of "O" is input on the touch screen by the stylus pen 300. Therefore, the first mobile terminal 100 transmits data indicating information about the logged-in account and data indicating a progress state of the game and a paused position of the game to the stylus pen 300 through the wireless communication connection.

Referring to FIG. 22, a touch gesture input (second touch input) having a shape of "P" is input on the touch screen in the main interface of the second mobile terminal 101 by the stylus pen 300, and the second mobile terminal 101 receives data indicating the information about the logged-in account and data indicating the progress state of the game and the paused position of the game, which are stored in the stylus pen 300, through the wireless communication connection.

Referring to FIG. 23, the game application is executed in the second mobile terminal 101, and the received data is provided to the game application. The login is executed according to the information about the logged-in account based on the provided data, and the game to which the progress state is reflected is started in the paused state in the game application.

Referring to FIGS. 21 to 23, in an embodiment, after the game play is paused in the first mobile terminal 100, the user may continue to play the paused game in the second mobile terminal 101 by using the stylus pen 300, without additional operations such as account login and loading of the stored data.

FIGS. 6 to 23 illustrate only an example in which the application of the mobile terminal is continuously executed by using the stylus pen 300 according to the embodiment. For example, the communication connection between the stylus pen 300 and the mobile terminal is not limited to the wireless communication connection, but may be a wired communication connection. The wired communication connection may be formed through a data line between the stylus pen 300 and the mobile terminal. In addition, the first touch input and the second touch input are not limited to the touch gesture input having a shape of "C" and "P", and may be another type of touch gesture input or another type of touch input. According to an embodiment, the first touch input and the second touch input are not the touch input on the touch screen, but correspond to the touch of the touch button formed in the touch input device or the pressing of the control button formed in the touch input device. According to another embodiment, the first touch input and the second touch input may correspond to selection of a predetermined icon displayed on the touch screen. It will be understood that, although the execution example of the application has been described as being executed in the two mobile terminals, the present disclosure is not limited thereto and the continuous execution of the application may be implemented through the touch input device in more terminals or the same terminal.

It will be understood that although the terms "first", "second", etc. may be used herein to describe different components, these components should not be limited by these terms. These components are only used to distinguish one component from another. For example, a first component may be named a second component. Similarly, a second component may be named a first component without departing from the scope of the embodiment.

It will be understood that when a component or a layer is referred to as being "on", "connected to", "coupled to" or "contacting" another component or another layer, it may be directly on, connected to, coupled to, or contact the other component or the other layer, or intervening components or layers may be present. On the contrary, it will be understood that when a component or a layer is referred to as being "directly on", "directly connected to", "directly coupled, or "directly contact" another component or another layer, no intervening component or layer is not present.

It should be understood that the method of controlling the mobile terminal by using the touch input device, according to an embodiment, may also be embodied as computer-readable code on a computer-readable recording medium. The computer-readable recording medium may be any data storage device capable of storing data that can be read by a computer system. The computer-readable recording medium may be read-only memory (ROM), random-access memory (RAM), CD-ROM, a magnetic tape, a floppy disk, an optical data storage device, and a carrier (data transmission through wired or wireless transmission line). The computer-readable recording medium may also be distributed over a network-connected computer system such that the computer-readable code is stored and executed in a distributed manner. Moreover, functional programs, codes, and code segments for implementing the present invention can be easily inferred by a general programmer having ordinary skill in the art to which the present invention pertains within the scope of the present invention.

While this disclosure has been shown and described with reference to specific embodiments thereof, it will be understood that various changes in form and details may be made by those skilled in the art without departing from the spirit and scope of the invention as defined by the appended claims.

While the present invention has been particularly shown and described with reference to the accompanying drawings, it will be understood that those of ordinary skill in the art will recognize that one embodiment may be practiced in other specific forms without departing from the spirit or essential characteristics thereof. Therefore, it will be understood that the above-described embodiments are illustrative and non-restrictive in all aspects.

The invention claimed is:

1. A mobile device for providing data to another mobile device using a touch input device, the mobile device comprising:
   a touch screen configured to obtain a touch gesture input by the touch input device, wherein touch gesture inputs are user-defined shapes;
   a communication module configured to transmit and receive data through a communication connection with the touch input device; and
   at least one processor configured to provide, to the touch input device in response to obtaining by the touch screen a first touch gesture input from a user, predetermined data having data associated with a first application that is currently being executed in the mobile device and indicating information about an account logged into in the first application,
   wherein the predetermined data is provided to the other mobile device through the touch input device based on obtaining a second touch gesture input by the other mobile device, wherein the first touch gesture input and the second touch gesture input are different forms,
   wherein the predetermined data is provided to a second application that matches the first application, and the account is logged into in the second application based on the predetermined data provided, and
   wherein the predetermined data comprises data indicating information about an address of a webpage of the first application and the logged-in account.

2. The mobile device of claim 1, wherein, based on the first touch gesture input being obtained by the touch screen, the at least one processor is further configured to determine a type of the first touch gesture input and to provide the predetermined data corresponding to the first application and the determined type to the touch input device.

3. The mobile device of claim 1, wherein, based on the first touch gesture input being obtained by the touch screen, the at least one processor is further configured to control display of a list of the predetermined data associated with the first application on the touch screen and to provide data selected from the displayed list by the user to the touch input device.

4. The mobile device of claim 1, wherein the predetermined data associated with the first application comprises at least one of an image or a text selected on an execution screen of the first application by the user, a file that is being edited in the first application, and a multimedia file that is being reproduced in the first application.

5. The mobile device of claim 1, wherein, based on the second touch gesture input by the touch input device being obtained by a touch screen of the other mobile device, the predetermined data provided to the touch input device is transmitted from the touch input device to the other mobile device, and the transmitted predetermined data is provided to the second application executed by the other mobile device.

6. The mobile device of claim 5, wherein the predetermined data comprises link information for downloading installation data for installing the second application that is the same as the first application.

7. The mobile device of claim 5, wherein the predetermined data comprises setting data for setting the second application that is the same as the first application.

8. The mobile device of claim 5, wherein the predetermined data comprises data indicating a state of the first application based on the first touch gesture input being obtained by the touch screen, and
   a state of the second application is made substantially identical to the state of the first application by using the predetermined data provided to the second application.

9. The mobile device of claim 5, wherein the first application is a web browsing application, and the predetermined data comprises an address of a current webpage of the first application, and
   the predetermined data is provided to the second application that is the web browsing application, and a web page corresponding to the address of the current webpage is opened in the second application.

10. The mobile device of claim 5, wherein, in a case where the first application has a multimedia reproduction function and multimedia is paused in the first application based on the first touch gesture input being obtained by the touch screen, the predetermined data comprises data indicating a reproduction state of the multimedia and a paused reproduction position of the multimedia, and
    the predetermined data is provided to the second application having the multimedia reproduction function, and reproduction of the multimedia is started in a paused state at a reproduction position in the second application.

11. The mobile device of claim 5, wherein, in a case where the first application is a game application and a game is paused in the first application based on the first touch gesture input being obtained by the touch screen, the predetermined data comprises data indicating a progress state of the game and a paused position of the game, and
    the predetermined data is provided to the second application that is the same as the first application, and the game is started in a paused state at the paused position in the second application.

12. The mobile device of claim 5, wherein, in a case where the first application has an account login function, the first application is a web browsing application, and the account is logged into in the first application based on the first touch gesture input being obtained by the touch screen.

13. The mobile device of claim 1, wherein, based on a third touch gesture input by the touch input device being obtained by the touch screen, the at least one processor is further configured to receive the predetermined data provided to the touch input device from the touch input device, and to provide the predetermined data received from the touch input device to a third application in the mobile device.

14. A method of controlling a mobile device by using a touch input device, the method comprising:
   obtaining a first touch gesture input by the touch input device on a touch screen of a first mobile device, wherein touch gesture inputs are user-defined shapes;
   providing, by the first mobile device, to the touch input device based on obtaining by the touch screen the first touch gesture input from a user, predetermined data having data, associated with a first application that is currently being executed in the first mobile device and indicating information about an account logged into in the first application;
   obtaining a second touch gesture input by the touch input device on a touch screen of a second mobile device; and
   providing the predetermined data stored in the touch input device from the touch input device to the second mobile device based on obtaining the second touch gesture input by the second mobile device, wherein the first touch gesture input and the second touch gesture input are different forms,
   wherein the predetermined data is provided to a second application that matches the first application, and the account is logged into in the second application based on the predetermined data provided; and
   wherein the predetermined data comprises data indicating information about an address of a webpage of the first application and the logged-in account.

15. The method of claim 14, wherein the predetermined data transmitted from the touch input device to the second mobile device is provided to the second application executed by the second mobile device.

16. The method of claim 15, wherein the predetermined data comprises link information for downloading installation data for installing the second application that is the same as the first application.

17. The method of claim 15, wherein the predetermined data comprises setting data for setting the second application that is the same as the first application.

18. The method of claim 15, wherein the predetermined data comprises data indicating a state of the first application based on the first touch gesture input being obtained by the touch screen, and
   a state of the second application is made substantially identical to the state of the first application by using the predetermined data provided to the second application.

19. The method of claim 14, wherein, based on a third touch gesture input by the touch input device being obtained by the touch screen of the first mobile device, the predetermined data transmitted from the first mobile device to the touch input device is transmitted to the first mobile device and provided to a third application in the first mobile device.

20. A computer program product comprising a computer readable storage medium having a computer readable program stored therein, wherein the computer readable program, when executed on a computing device, causes the computing device to:
   obtain a first touch gesture input by a touch input device on a touch screen of a first mobile device, wherein touch gesture inputs are user-defined shapes;
   provide, to the touch input device in response to obtaining by the touch screen the first touch gesture input from a user, predetermined data having data, associated with a first application that is currently being executed in the first mobile device and indicating information about an account logged into in the first application;
   obtain a second touch gesture input by the touch input device on a touch screen of a second mobile device; and
   provide the predetermined data stored in the touch input device from the touch input device to the second mobile device based on obtaining the second touch gesture input by the second mobile device, wherein the first touch gesture input and the second touch gesture input are different forms,
   wherein the predetermined data is provided to a second application that matches the first application, and the account is logged into in the second application based on the predetermined data provided; and
   wherein the predetermined data comprises data indicating information about an address of a webpage of the first application and the logged-in account.

* * * * *